US011657145B2

(12) United States Patent
Cristina et al.

(10) Patent No.: US 11,657,145 B2
(45) Date of Patent: May 23, 2023

(54) VULNERABILITY ASSESSMENT OF CONTAINERISED INSTALLATION

(71) Applicant: BRITISH TELECOMMUNICATIONS PUBLIC LIMITED COMPANY, London (GB)

(72) Inventors: Claudia Cristina, London (GB); Simon Beddus, London (GB); Fadi El-Moussa, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 467 days.

(21) Appl. No.: 16/761,549

(22) PCT Filed: Oct. 25, 2018

(86) PCT No.: PCT/EP2018/079265
§ 371 (c)(1),
(2) Date: May 5, 2020

(87) PCT Pub. No.: WO2019/091789
PCT Pub. Date: May 16, 2019

(65) Prior Publication Data
US 2020/0265134 A1      Aug. 20, 2020

(30) Foreign Application Priority Data
Nov. 9, 2017    (EP) .................................... 17200921

(51) Int. Cl.
*G06F 21/54*       (2013.01)
*G06F 21/53*       (2013.01)
(Continued)

(52) U.S. Cl.
CPC .............. *G06F 21/54* (2013.01); *G06F 21/53* (2013.01); *G06F 21/577* (2013.01); *H04L 67/34* (2013.01)

(58) Field of Classification Search
CPC ........ G06F 21/54; G06F 21/53; G06F 21/577; G06F 8/60; H04L 67/34
See application file for complete search history.

(56) References Cited

U.S. PATENT DOCUMENTS

| 9,116,768 | B1 * | 8/2015 | Sawhney | .................. G06F 8/60 |
| 2007/0157195 | A1 * | 7/2007 | Gaa-Frost | ................. G06F 8/60 717/174 |

(Continued)

FOREIGN PATENT DOCUMENTS

EP      2 782 038      9/2014

OTHER PUBLICATIONS

Examination Report and Notification of Intention to Grant under Section 18(4) for GB Application No. 1718557.0 dated Apr. 1, 2020, 2 pages.

(Continued)

*Primary Examiner* — Trong H Nguyen
(74) *Attorney, Agent, or Firm* — Nixon & Vanderhye P.C.

(57) ABSTRACT

A containerisation orchestrator (26) is controlled by an analysis system (20, 21, 22) which assesses an application and a device for compatibility to have a candidate application installed on the device using the orchestrator. The analysis includes an assessment of the vulnerability of the installed application to failure or malicious attack, and a risk assessment of the consequences of such an event. The candidate containerised configuration (20) for the application is also assessed for compatibilities and vulnerabilities.

18 Claims, 2 Drawing Sheets

Figure 1:
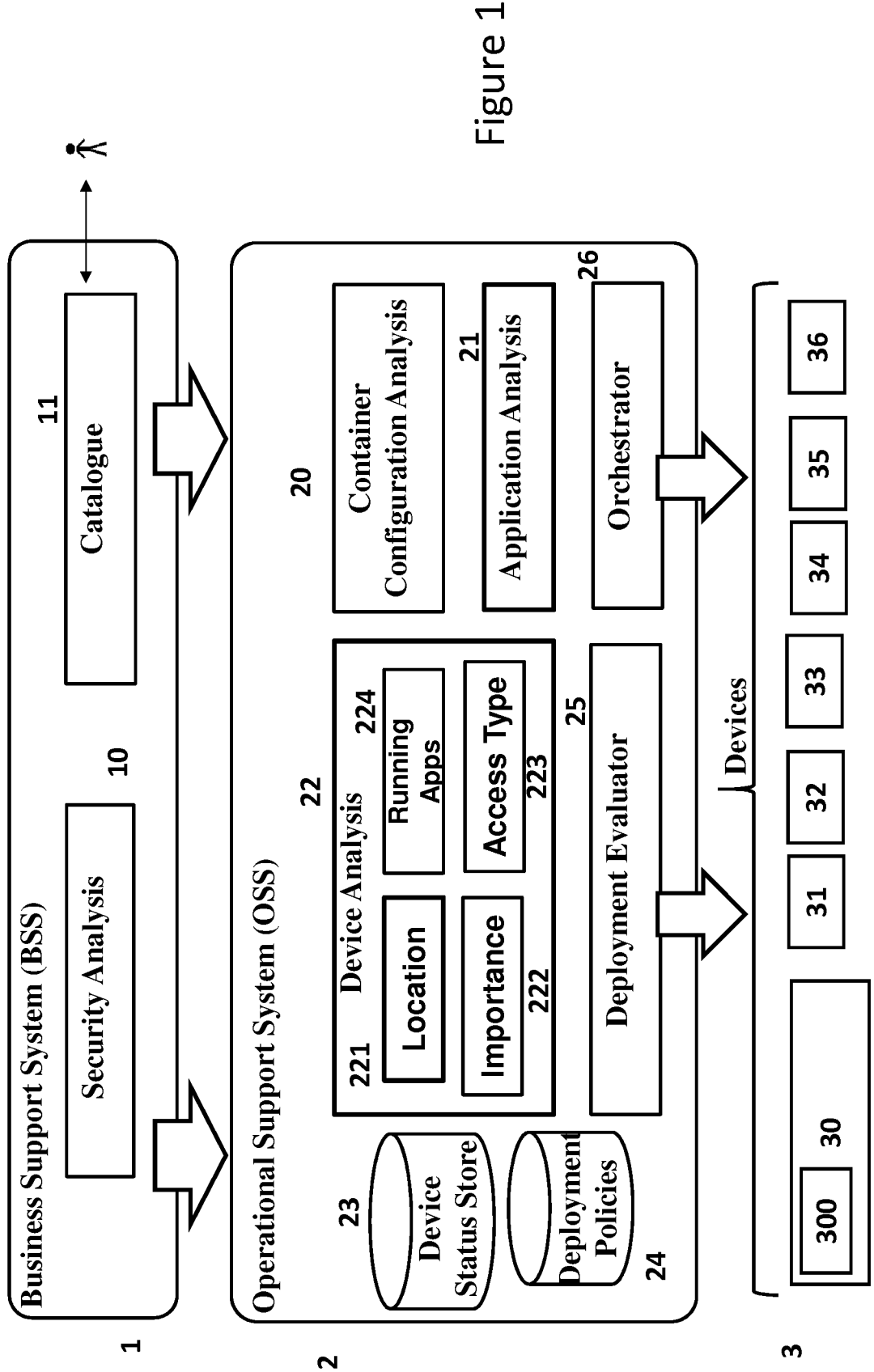

(51) Int. Cl.
  *G06F 21/57*  (2013.01)
  *H04L 67/00*  (2022.01)

(56) References Cited

U.S. PATENT DOCUMENTS

| | | |
|---|---|---|
| 2010/0313196 A1 | 12/2010 | De Atley et al. |
| 2016/0162269 A1* | 6/2016 | Pogorelik ................. G06F 8/61 717/174 |
| 2017/0201490 A1* | 7/2017 | Kinder ................ H04L 63/0272 |
| 2017/0300697 A1 | 10/2017 | Iyer et al. |

OTHER PUBLICATIONS

Extended European Search Report for GB Application No. 17200921.9 dated Feb. 26, 2018, 9 pages.
Search Report for GB Application No. 1718557.0 dated May 1, 2018, 4 pages.
International Preliminary Report on Patentability for PCT/EP2018/079265 dated Feb. 7, 2020, 17 pages.
International Search Report for PCT/EP2018/079265 dated Jan. 22, 2019, 3 pages.
Written Opinion of the ISA for PCT/EP2018/079265 dated Jan. 22, 2019, 10 pages.
Examination Report for EP 18 789 175.9 dated Dec. 17, 2021 (5 pages).

\* cited by examiner

VULNERABILITY ASSESSMENT OF CONTAINERISED INSTALLATION

This application is the U.S. national phase of International Application No. PCT/EP2018/079265 filed Oct. 25, 2018 which designated the U.S. and claims priority to EP Patent Application No. 17200921.9 filed Nov. 9, 2017, the entire contents of each of which are hereby incorporated by reference.

This invention relates to the management of computer server systems, and in particular to the use of a "container" server architecture.

The use of "Container" technology to run services and applications is becoming increasingly common due to its flexibility, packing density, portability across systems, and ease of deployment and configuration.

Container technology allows multiple applications and their libraries to be run with a degree of isolation on a common operating system, but each operates inside its own isolated environment with only software components and libraries it requires, packaged in a standardised way. Using containers results in smaller applications, which are quicker to download, and provides a much higher packing density of applications per physical server than virtualisation or indeed the traditional operating system and application model, thereby using less of the system's resources. This approach means applications will be more efficient, lightweight and portable between different operating systems. The container requires only the application and necessary libraries to run. This architecture results in applications that are smaller (a few tens of Megabytes), quicker to download, and use fewer resources, and are very fast to start up, often in the tens of milliseconds.

Container technology is often compared to virtual machine (VM) technology. Virtualisation enables multiple operating systems and applications to run on the same physical hardware. A hypervisor, an emulation of the actual physical hardware, allows slicing of compute, storage and network for each VM. The VM itself acts as if it has its own hardware when in fact it is has been virtualised by the hypervisor beneath. Thus, each VM represents a complete operating system which means it is large in size (Gigabytes), uses up many system resources and can take a long time to start up, sometimes several minutes depending on size and underlying compute capability.

The usage of containerised applications requires no virtualisation of the hardware as they only abstract the operating system kernel, and provides a faster and less processor-heavy approach. This makes containers more efficient, faster to implement and more portable than virtual machines.

In Virtualisation and VMs, the hypervisor is designed to protect the VMs from one another, or in other words provide isolation. Container deployment does not have this inherent isolation, and there is a lack of visibility to the user of the security of the configuration deployed. This is because the images (containers) share the same operating system and as such the isolation between containers is reduced, thus increasing the security threat. Container features such as 'user spaces' and control groups can be set to increase the isolation but they require a detailed knowledge of container technology that is unlikely in the average user. At the same time, there are issues or omissions in the area of network management and encryption that make the efficient and secure deployment of container onerous.

Three main types of threat exist, referred to herein as application security (the security of the application being installed), container security (the security of the configuration of the container once the application has been installed) and environment security (the context in which the containerised application is to operate, such as systems it will interact with, devices it will control or be controlled by, geographical location, and other applications running on the same server). Likewise, there are no administration or custom based policies to control or specify the deployment of container based applications.

Container technology offers lightweight execution of applications and is thus highly suited to small IoT devices such as Raspberry PIs, smart phones, home hubs and small format PCs, which can be connected in linear and meshed networks. These networks and devices are likely to be subject to cyberattacks due to the large number of applications being run on a device, and the multiple network protocols and connection types used.

There is also a need to prioritise and constrain the deployment of applications onto specific applications in safety-critical and security-critical applications. Examples of such applications are those handling personal or financial data, or operating safety-critical equipment such as a heart rate monitor application deployed in a doctor's surgery. Such applications may be expected to require a strict deployment policy for the application and the device. However, such policies may be over-restrictive for more general use.

During the lifetime of an application's deployment in a container, new applications and device features may be installed that can affect the secure operation of the container-based application. It is desirable that such changes are analysed for their effect on the existing deployed applications, as well as for the effect of the existing applications on the newly-installed one.

Development teams may deploy applications that are vulnerable or inefficient, due to a lack of understanding of containers in general or the specific system on which they are working. Such inefficiencies may occur for example if the development team are over-cautious in designing additional applications because they are unaware of existing installations of network visualisation and security enforcement. Some of these deficiencies are addressed by additional security products which analyse a container installation for vulnerabilities but these can be complex and require constant up-skilling of IT staff. They also only analyse the system as it exists, and thus can identify vulnerabilities introduced to the complete system by a new application. It will not identify whether a more efficient installation would have been possible.

Other systems simply operate a "banned list" of applications, or classes of application, which are prohibited from installation. Such a list requires frequent updating as new threats are identified, and inevitably there will be "false positives" of harmless applications, and "false negatives" of potentially harmful applications. In particular they may be applications which are on the "banned list" because of a potential threat they create in one context, but which may be harmless or even useful in another.

The range of container tools makes enforcement of good practice or company policy difficult, and it is difficult to get a general overview of the system's performance and security across all container deployments.

It is known, for example from US2016/162269, to analyse a device such as a smartphone for compatibility with an application before loading it, and provide an indication to the user of the level of risk the application presents to the operation or security of the device. It is then for the user to decide whether the risk is acceptable.

The present invention provides a computer-implemented process for controlling a containerisation orchestrator, comprising the steps of:
a) selecting a candidate application for containerised deployment to a device
b) retrieving application software for running the application
c) analysing the application software for vulnerabilities
d) analysing the selected container deployment configuration
e) assessing operational parameters of the device
f) comparing the operational parameters of the device with the vulnerabilities identified in the candidate application software,
g) comparing the operational parameters of the container deployment configuration with the vulnerabilities identified in the candidate application software,
h) generating a risk score value based on the comparisons in steps f and g
i) comparing whether the risk score value is compatible with a predetermined threshold value
j) if compatibility is not identified, modifying the container deployment configuration to improve the risk score value and repeating steps g) to i);
k) if compatibility is identified, controlling the orchestrator to containerise and deploy the candidate application software on the device.

The use of a containerised operating system allows the orchestrator to modify or reconfigure that operating system to manage the risk presented by a new application. Analysis of the application may include identifying security patches installed on the application and comparing the installed patches with a data base of available patches. The orchestrator may retrieve patches identified in the database and install them on the application if they are not already installed.

The analysis of the candidate application includes reference to a database of known security threats to that application, and assessment of security of communications connections between the device and a network. It may also take into account the geographical location of the device.

It may also include analysis of the deployment configuration identifies and quantifies the resources in the device required for deployment, and assessment of the operational parameters of the device to determine the capabilities of the device, which may include the requirements of applications already running on the device.

If compatibility is not identified, the orchestrator may repeat the analysis steps using a different candidate application until a suitable application is identified.

After installation of a containerised application, the steps of the process may be repeated periodically, or in response to predetermined conditions such as changes in the environment of the device on which the containerised application is installed, reported changes in threat levels, or installation of further applications on the device, to determine if the configuration still meets the deployment policies and, if it does not, to select and deploy an alternative configuration. Adaptation or replacement of an existing application may be performed if this facilitates installation of a new application that is incompatible with the existing one.

The invention also extends to a computer system including a processor and a memory storing computer program code for performing the steps of the process of any preceding claim, and to a computer program element comprising computer program code to, when loaded into a computer system and executed thereon, cause the computer to perform the process.

In embodiments of the invention, the candidate application is assessed to determine whether it has up to date security patches. The process may retrieve and install any patches that are missing. Assessment may also retrieve information relating to known security threats to the candidate application.

Assessment may also compare the resources required by the deployed configuration of the candidate application with those available on the device, taking into account any other applications already running on the device, to determine whether there are sufficient suitable ports, Random Access memory, processing power, and other resources to run the candidate application and any existing applications reliably.

The device may also be assessed for security of its communications connections. Other factors which may be taken into account include the operational context of the device, taking account of any safety-critical applications running, or proposed to be run, on the device, and factors such as its location.

The result of the assessment of the device, containerisation protocol, and application, may be used to generate a risk score value, which can be compared with a predetermined threshold value to determine whether the deployment should go ahead. If compatibility is not identified, and the orchestrator does not deploy the candidate application software, the analysis steps may be repeated using a different candidate application.

The invention may be embodied in software comprising computer program code for controlling a general-purpose computer to perform the steps of the process.

The invention tests the validity of the application, container and device prior to deployment and during the life of the application, and can also manage the actual deployment and configuration of the application.

Embodiments of the invention provide a dynamic risk analysis for containers installed in devices intended for use in the "Internet of Things" (IoT) and provide continuous monitoring of the security of applications deployed to containers. In the preferred embodiment, the process includes risk analysis in three aspects.

Firstly, there is an Application Risk Analysis—each application before deployment is analysed for any potential problems such as missing patches, vulnerabilities, current security threats targeting that application, which might compromise the running of that application or the device into which it is to be installed.

Secondly, there is a Container Risk Analysis—an analysis of the container in which the application is to be installed, to identify the protocol it will use, and any open ports or sockets.

Thirdly, there is a Device Risk Analysis—to validate any security risks associated with the device itself, such as current running applications, location, sensitivity, access type required.

Having assessed these aspects, the result of the risk analysis of the application, container and IoT device can be evaluated against a deployment policy in order to determine whether deployment of the application meets that policy.

In a preferred arrangement the risk analysis process continues to provide security monitoring after the application has been installed, to obtain up-to-date information about the risk of the deployed application at the IoT device in the light of new security alerts or patches, or changes to the context in which the application is running. The risk analysis may change due to changes in factors such as the device's location, extra applications which have been installed, other services installed on the IoT device etc, the type of network connections it is connected through.

A simple example, when a customer or user selects an application to be deployed the application is analysed for missing patches, vulnerabilities, malware and other known threats. Likewise, the container that wraps the application is analysed for open ports, protocols, sockets and isolation (namespace and cgroups) from other applications and the device itself. The target device is analysed to determine what are the applications currently deployed, location, sensitivity to failure (i.e. mission critical), network vulnerabilities and installed security countermeasures. The result of this analysis to produce a deployment-score that can be compared with a deployment policy to decide where deployment and operation can go ahead.

At this stage, the application can be rejected or deployed. If deployment is made a deployment descriptor based on the app/container and device score is delivered to the orchestrator. The orchestrator will deploy the application, with container settings on the destination device.

Applications will be constantly monitored throughout the life of their deployment on the device. Application and device scores will be compared to their original values, should they lower the application/device anomaly will be identified to the administrator and even customer.

Figure 2:
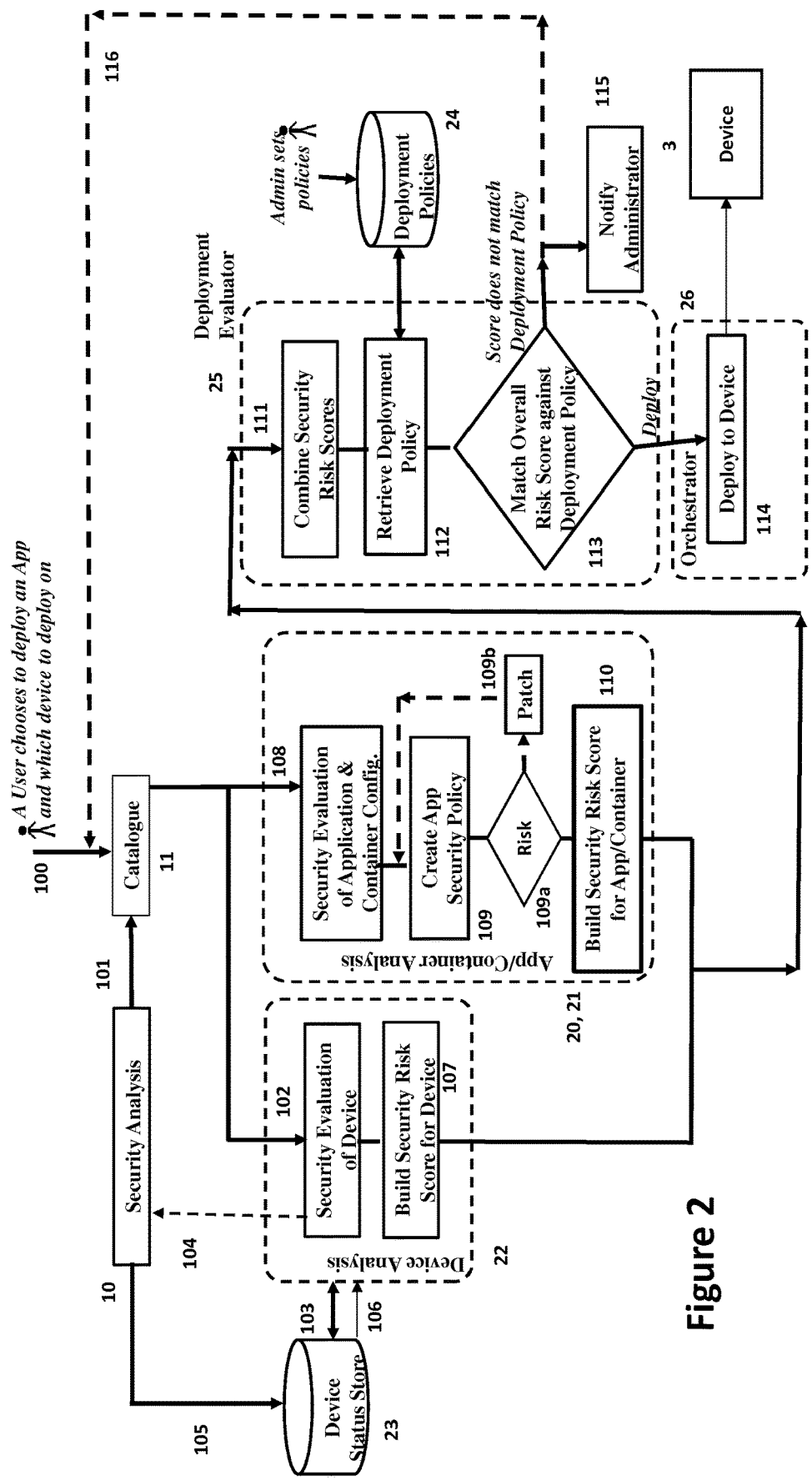

An embodiment of the invention will be described with reference to the drawings, in which:

FIG. 1 depicts a general arrangement of the functional elements which co-operate to perform the invention FIG. 2 is a flow chart depicting the operation of this embodiment The functional elements depicted in FIG. 1 will be typically embodied as software running on general purpose computers, and may be distributed systems, with individual functional elements communicating with each other over a data network.

The functional elements can be categorised into background functions (depicted generally as a business support system 1) which includes components of the system which deal with customers/users of the system, and operational functions (depicted as an operational support system 2) which includes the decision making components which handle security scans, retrieving/creation of policies and the orchestration and deployment of applications.

The background functions 10, 11 collect data for use by the operational support system 2. This data may be manually entered in response to known security or other issues, or collected automatically, for example on reliability of the applications or the devices they are installed in, location and network topography or other factors which may affect the risk associated with a particular application, or device. The principal functions are a security analysis tool 10 and a cataloguing function 11 recording matters specific to individual applications, devices or locations.

The Security Analysis Tool (10) scans applications/containers in the catalogue 11 to give them an initial standalone security risk score, which users are able to see prior to deploying an application. An agent 300 of this tool is present in each available device 30, 31, 32 . . . (depicted only for device 30), and periodically performs security evaluation of the devices, storing the device score/status in a Device Status Store 23 (step 105) as will be discussed later. The store 23 keeps information about previous scans (e.g. vulnerabilities found, time of the last scan).

The cataloguing function 11 is a graphical user interface through which the user can control the deployment of applications on devices. The catalogue 11 stores information relating to available applications and the devices in which they can be deployed. For each application, its security risk score is displayed. When a user selects an application and a device, the cataloguing function retrieves (step 101) and displays an estimate of the security risk score associated with the selected device if the application were to be deployed. If a user then chooses to deploy an application, it triggers the security evaluation of the application (20, 21) and of the chosen device (22).

The operational support system 2 comprises an orchestrator 26 which performs the configuration of the containerised application, under the control of a deployment evaluator 25 which assesses one or more candidate container configurations and selects the configuration (if any) that is suitable for the context in which the application is to be used. The evaluator takes information from a configuration analysis function 20, an application analysis function 21 and a device analysis function 22.

The application and container Analysis functions 20, 21 perform a security evaluations of the applications and the containers, and the container intended deployment configuration and builds a security risk score for that configuration.

The device analysis function 22 performs a security evaluation of the device on which an application is to be deployed, and builds a security risk score for the device, using data relating to location 221, importance (criticality) 222, the access type required 223, and other applications running on the device 224, which may be stored by the OSS in a store 23 or obtained by interrogation of the device itself.

The OSS also maintains a data base of deployment policies 24 which are set for each device by an administrator using user requirements for that device. These are compared by the evaluator 25 with the outputs of the analysis functions 20, 21, 22 to determine whether a proposed configuration can be permitted to be used by the orchestrator 26, according to the requirements, vulnerabilities and device it is being deployed on. The policy to be applied specifies a configuration which will give the application a security level appropriate to its context, which can include but is not limited to firewall rules, intrusion detection/prevention, and anti-malware scans.

As will be described in more detail with reference to FIG. 2, the deployment evaluator 25 combines the security risk scores generated by the device evaluator 22 for the selected device, and the application evaluator 21 and the container configuration analyser 20 to match against a defined deployment policy previously set by an administrator and stored in the policy store 24. The application/container is only deployed by the orchestrator 26 if the overall security risk score matches what is set in the deployment policy. As will be described below, the deployment evaluator 25 may be arranged to require modification of some of the running applications 224 (for instance, replacing with a higher-security version) in order to facilitate installation of a new application.

The evaluator may be run periodically after installation of a containerised application to determine if the configuration still meets the deployment policies. These may have changed for example because of changes in reported threat levels, or changes in the environment of the device. Such analysis will also take place whenever a new application is installed on the device, as the existing applications 224 are included amongst the factors considered when adding a new application. In one embodiment, the deployment evaluator may be arranged to require adaptation or replacement of an existing application in order to allow installation of a new application that is incompatible with the existing one.

The main flow of events taking place in the process of this embodiment is depicted in FIG. 2. The process starts when a user selects an application from the catalogue to be deployed onto an available device 30, 31, 32 . . . 36 (step 100). The catalogue function 11 responds by triggering the device Analysis function 22 to begin security evaluation of the device (step 102) and generate a security risk score for the device (step 107).

The Device Analysis function 22 initially queries the Device Status Store 23 (step 103) to check when the last scan of the device was performed by the security analysis function 10. If a scan has been performed within a predetermined period, the results from that scan can be used: otherwise the advice analysis function triggers the security analysis function 10 to perform a new scan (step 104), the results of which are delivered to the device status store 23 (step 105) to be read by the device analysis function 22 (step 106).

The security scan analysis process 10 produces a series of different properties which are specific to the application or device being scanned. The security risk scores can be produced by checking these properties against predetermined rules. An example of how these scores can be devised follows.

The device analysis function 102 then checks a number of factors to determine a security risk score for the device. The factors taken into account may include the geographical location of the device—for example if the device is located in a hospital it may require a particular high level of security. Other factors include identifying other applications running on the device, as these may be associated with different levels of risk which may affect, or be affected by, the application to be installed. The type of network access requested by the application may be another factor to be taken into account, for example the application may be specified to require a fixed, password protected connection. The connection method to be used may also be relevant if, for example, a specified bandwidth is required. A further factor may be a flag value identifying how important the integrity of the device is: this would be a user-specified factor dependent on factors such as the potential consequences of the device being corrupted or compromised.

Each property is scored. So for example, if a device has more than a predetermined number of applications/containers running it is given a high risk score. The limiting number may vary depending on the capabilities of the device, so that for example a first device may score "high" if it is running eight or more applications, whereas a more powerful device may be able to run up to twenty applications without impairment of its performance, and would therefore have a higher threshold value.

The property scores are then combined (step 107) added to produce a final security risk score for the device or application/container. Properties to be assessed may include average CPU use, average RAM use, importance (assessed either by a user-determined quantity, or by external measures such as geographical location), number of applications running, and number of open ports. For any of these properties which exceed a given threshold (for example CPU use greater than half total CPU capacity), a "high" score is recorded. The scores are combined to provide a total risk score.

(The scoring system, and method of combining the individual scores, can follow any suitable algorithm. For example, each property may be scored "high"=2, or "low"=1, and the resulting scores added. Alternatively, it may be appropriate in some scoring systems to multiply the scores. More than two levels may be used for some or all of the properties.

The device analysis scan result is stored in the Device Status Store 23.

The Application/Container Analysis 20, 21 is also triggered by the Catalogue function 11. It performs a security scan on the application to be deployed, to determine if there are any vulnerabilities, missing patches, current threats to the application etc. The container configuration set is also evaluated e.g. for protocols to be used, ports requested, sockets, resources required, the CPU capacity required, the RAM capacity required, and whether 'write' privileges are required.

Upon completion of the application analysis, a security policy is created (step 109). If any security flaws the application may have are identified (step 109a), security patches are added (step 109b), and a security risk score is produced for the application (step 110), taking into consideration the security policy created. A security policy is then produced to fix security issues (if any) of the application and configuration. This score and the security risk score produced by the device analysis are combined (step 111) to produce a final risk score for deploying the application onto said device. The way the scores are combined will depend on the scoring system used as risk may be assessed as additive or multiplicative, (or some other function) of the various factors assessed. The security policy is then applied and the analysis is done again to produce a final score for the application and container configuration. These two security risk scores combined form the overall security risk score for the application.

During the application/container analysis process, some properties of the device on which the application is to be deployed are checked (e.g. available CPU, which ports are not in use) to ensure that the security policy that is created can set the correct configuration.

The Deployment Evaluator 25 combines the security risk scores from the device analyser 22 and application/container analysers 20, 21 to produce an overall risk score for deploying the application onto the device (step 111). Depending on the algorithm to be used, the scores may be added, multiplied, or combined using some other mathematical function.

The deployment policy for the device is then retrieved (step 112) from the policy store 24 to determine if the application should be deployed on the device (step 113), by checking the overall security risk score against the retrieved policy. The deployment policies set out the minimum security risk score an application must have to be deployed on a device, as well as other specific configuration requirements the application must follow (e.g. not using a port which is out of bounds on the device or use more than the allowed resources).

The policies would be set by an administrator taking user requirements into consideration.

If the security risk score meets the requirements stated in the policy (that is to say, the combined risk score 111 does not exceed the maximum value specified on the deployment policy store (24), the Deployment Evaluator 25 triggers the Orchestrator 26 to deploy the application onto the selected device 30 (step 114), and the Orchestrator deploys the application onto the device, with the configuration and/or policies set in the evaluation process.

If the risk score exceeds the policy value (step 113) the deployment evaluator 25 notifies the administrator that the application cannot be deployed (step 115), or an alternative application may be selected by the catalogue function 11 for evaluation and potential deployment (step 116).

The invention claimed is:

1. A computer-implemented process for controlling a containerisation orchestrator, by assessing a candidate application for containerised deployment to a device, the process comprising the steps of:
   a) retrieving application software for running the candidate application,
   b) analysing the application software for vulnerabilities,
   c) analysing a container deployment configuration for the candidate application,
   d) retrieving data relating to operational parameters of the device,
   e) comparing the operational parameters of the device with the vulnerabilities identified in the application software,
   f) comparing operational parameters of the container deployment configuration with the vulnerabilities identified in the application software,
   g) generating a risk score value based on the comparisons in the steps e) and f),
   h) comparing the risk score value with a predetermined threshold value to identify compatibility,
   i) in response to determining that the compatibility is not identified, modifying the container deployment configuration by modifying parameters of the candidate application to improve the risk score value and repeating the steps f) to h), and
   j) in response to determining that the compatibility is identified, controlling the orchestrator to containerise and deploy the application software on the device.

2. The process according to claim 1, wherein the analysis of the application software includes identifying security patches installed on the application software and comparing the installed security patches with a database of available patches.

3. The process according to claim 2, wherein the orchestrator is arranged to retrieve patches identified in the database and install the identified patches on the application software if the identified patches are not already installed.

4. The process according to claim 1, wherein the analysis of the application software includes reference to a database of known security threats to the application software.

5. The process according to claim 1, wherein the analysis of the container deployment configuration identifies and quantifies resources in the device required for deployment.

6. The process according to claim 1, further comprising performing an assessment of the operational parameters of the device that determines capabilities of the device.

7. The process according to claim 6, wherein the determination of the capabilities of the device takes into account requirements of applications already running on the device.

8. The process according to claim 1, further comprising performing an assessment of the operational parameters of the device that includes an assessment of security of communications connections between the device and a network.

9. The process according to claim 1, further comprising performing an assessment of the operational parameters of the device that includes an assessment of location of the device.

10. The process according to claim 1, wherein if the application software cannot be modified so that the risk score value satisfies the threshold value, the orchestrator does not deploy the application software and the steps a)-i) are repeated using a different candidate application.

11. The process according to claim 1, wherein, after installation of a containerised application, the steps of the process are repeated in response to predetermined conditions to determine if the container deployment configuration still meets deployment policies and, if the container deployment configuration does not, to select and deploy an alternative configuration.

12. The process according to claim 11, wherein the steps of the process are repeated periodically, at predetermined intervals of time.

13. The process according to claim 11, wherein the predetermined conditions include changes in an environment of the device on which the containerised application is installed.

14. The process according to claim 13, wherein the predetermined conditions include changes in reported threat levels.

15. The process according to claim 13, wherein the predetermined conditions include installation of a new application on the device.

16. The process according to claim 15, wherein adaptation or replacement of an existing application is performed if required to allow installation of a new application that is incompatible with the existing application.

17. A computer system including a processor and a memory storing computer program code which upon execution by the processor performs steps for controlling a containerisation orchestrator, by assessing a candidate application for containerised deployment to a device, the steps comprising:
   a) retrieving application software for running the candidate application,
   b) analysing the application software for vulnerabilities,
   c) analysing a container deployment configuration for the candidate application,
   d) retrieving data relating to operational parameters of the device,
   e) comparing the operational parameters of the device with the vulnerabilities identified in the application software,
   f) comparing operational parameters of the container deployment configuration with the vulnerabilities identified in the application software,
   g) generating a risk score value based on the comparisons in the steps e) and f),
   h) comparing the risk score value with a predetermined threshold value to identify compatibility,
   i) in response to determining that the compatibility is not identified, modifying the container deployment configuration by modifying parameters of the candidate application to improve the risk score value and repeating the steps f) to h), and
   j) in response to determining that the compatibility is identified, controlling the orchestrator to containerise and deploy the application software on the device.

18. A non-transitory computer-readable storage medium storing computer program code to, when loaded into a computer system and executed thereon, cause the computer to perform steps for controlling a containerisation orchestrator, by assessing a candidate application for containerised deployment to a device, the steps comprising:
   a) retrieving application software for running the candidate application,
   b) analysing the application software for vulnerabilities,
   c) analysing a container deployment configuration for the candidate application, d) retrieving data relating to operational parameters of the device,
e) comparing the operational parameters of the device with the vulnerabilities identified in the application software,
f) comparing operational parameters of the container deployment configuration with the vulnerabilities identified in the application software,
g) generating a risk score value based on the comparisons in the steps e and f),
h) comparing the risk score value with a predetermined threshold value to identify compatibility,
i) in response to determining that the compatibility is not identified, modifying the container deployment configuration by modifying parameters of the candidate application to improve the risk score value and repeating the steps f) to h), and
j) in response to determining that the compatibility is identified, controlling the orchestrator to containerise and deploy the application software on the device.

* * * * *